United States Patent
Hamblin et al.

(10) Patent No.: US 10,002,112 B2
(45) Date of Patent: Jun. 19, 2018

(54) METHODS AND APPARATUS FOR OBTAINING FLIGHT DATA FOR ELECTRONIC LOGBOOK AND GRAPHICAL SUMMARY PRESENTATION

(71) Applicant: HONEYWELL INTERNATIONAL INC., Morris Plains, NJ (US)

(72) Inventors: Chris Hamblin, Lee's Summit, MO (US); Sean Caufield, Avondale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 9 days.

(21) Appl. No.: 15/176,807

(22) Filed: Jun. 8, 2016

(65) Prior Publication Data

US 2017/0357618 A1 Dec. 14, 2017

(51) Int. Cl.
| | |
|---|---|
| G06F 17/21 | (2006.01) |
| G06F 3/0484 | (2013.01) |
| B64D 45/00 | (2006.01) |
| G07C 5/00 | (2006.01) |
| G07C 5/08 | (2006.01) |
| G06Q 50/30 | (2012.01) |

(52) U.S. Cl.
CPC ........... *G06F 17/212* (2013.01); *B64D 45/00* (2013.01); *G06F 3/0484* (2013.01); *G06Q 50/30* (2013.01); *G07C 5/008* (2013.01); *G07C 5/085* (2013.01)

(58) Field of Classification Search
None
See application file for complete search history.

(56) References Cited

U.S. PATENT DOCUMENTS

| | | | |
|---|---|---|---|
| 6,278,913 B1 | 8/2001 | Jiang | |
| 8,374,733 B2 | 2/2013 | Dexheimer et al. | |
| 8,700,236 B1 | 4/2014 | Berman | |
| 8,732,233 B2 | 5/2014 | Allen | |
| 2010/0121938 A1* | 5/2010 | Saugnac | G07C 5/008 709/218 |
| 2011/0040428 A1 | 2/2011 | Dexheimer et al. | |
| 2011/0241902 A1 | 10/2011 | Shavit | |

(Continued)

FOREIGN PATENT DOCUMENTS

FR    2883088 A1    9/2006

OTHER PUBLICATIONS

GRT Avionics; Automatic Logbook; http://www.grtavionics.com/logbook.html, 2015.

(Continued)

*Primary Examiner* — Krishnan Ramesh
(74) *Attorney, Agent, or Firm* — Lorenz & Kopf, LLP

(57) ABSTRACT

A method for obtaining flight data for one or more recent flights of an aircraft is provided. The method extracts, via a communication device, avionics data from a data communication bus onboard the aircraft; identifies electronic logbook data and aircraft performance data, based on the extracted avionics data; incorporates the electronic logbook data into an electronic logbook to create an updated electronic logbook; creates a summary of the one or more recent flights, based on the aircraft performance data; and presents, via a display device, the updated electronic logbook and the summary of the one or more recent flights.

16 Claims, 6 Drawing Sheets

(56) References Cited

U.S. PATENT DOCUMENTS

| | | | | |
|---|---|---|---|---|
| 2011/0313597 A1* | 12/2011 | Wilson | ............... | G01C 23/00 |
| | | | | 701/3 |
| 2015/0066285 A1* | 3/2015 | Albouy | ............... | G07C 5/006 |
| | | | | 701/29.3 |
| 2015/0339943 A1 | 11/2015 | Khan | | |
| 2016/0055685 A1* | 2/2016 | Lilly | ............... | G07C 5/0808 |
| | | | | 701/1 |
| 2016/0343260 A1* | 11/2016 | Branthomme | ......... | G01C 23/00 |

OTHER PUBLICATIONS

Gogo; Building the Case for the Connected Aircraft; The Future of Aeronautical Connectivity Report. Valour Consultancy, 2014.

Allen, D., Real Time Information Across an Airline's Enterprise, 2014.

Esterline Produce Information; PilotView Crew Information System, 2015.

Extended EP Search Report for Application No. 17172979.1-1871 dated Sep. 11, 2017.

\* cited by examiner

METHODS AND APPARATUS FOR OBTAINING FLIGHT DATA FOR ELECTRONIC LOGBOOK AND GRAPHICAL SUMMARY PRESENTATION

TECHNICAL FIELD

Embodiments of the subject matter described herein relate generally to electronically capturing, storing, calculating, and displaying flight data. More particularly, embodiments of the subject matter relate to obtaining and displaying electronic pilot logbook data and aircraft performance data.

BACKGROUND

Pilots and other flight crew members have a responsibility to accurately document and record their training and aeronautical experience in a timely and acceptable manner. Likewise, federal regulations limit flight crew duty time and require minimum rest times for commercial pilots. This requires airlines and operators to calculate and track flight crew duty time in order to determine which pilots and crews are available for duty. This is a time consuming and burdensome requirement for pilots and airlines, and the manual nature of the task often results in inaccurate or incomplete records which results in increased time on task, increased operational costs, and potential for Federal Aviation Authority (FAA) violations and fines.

Accordingly, it is desirable to provide a mechanism through which the manual recordkeeping may be reduced or eliminated. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for obtaining flight data for one or more recent flights of an aircraft. The method extracts, via a communication device, avionics data from a data communication bus onboard the aircraft; identifies electronic logbook data and aircraft performance data, based on the extracted avionics data; incorporates the electronic logbook data into an electronic logbook to create an updated electronic logbook; creates a summary of the one or more recent flights, based on the aircraft performance data; and presents, via a display device, the updated electronic logbook and the summary of the one or more recent flights.

Some embodiments provide an apparatus for obtaining flight data onboard an aircraft. The apparatus includes a memory element, configured to store an electronic logbook; a communication device, configured to establish a first communication link with a data communication bus onboard an aircraft; a display device, configured to present graphical elements associated with the electronic logbook; and at least one processor, communicatively coupled to the memory element, the communication device, and the display device, the at least one processor configured to: extract, via the communication device, avionics data from the data communication bus; identify electronic logbook data and aircraft performance data, based on the extracted avionics data; incorporate the avionics data into the electronic logbook to create an updated electronic logbook; create a graphical summary of a recent flight, based on the aircraft performance data; and present, via the display device, the updated electronic logbook and the graphical summary of the recent flight.

Some embodiments provide a non-transitory, computer-readable medium containing instructions thereon, which, when executed by a processor, perform a method. The method obtains, via a communication device, electronic logbook data and aircraft performance data transmitted over a data communication bus onboard an aircraft, wherein the electronic logbook data and aircraft performance data are derived from avionics data originating from avionics systems onboard the aircraft; and presents, via a display onboard an aircraft, an updated electronic logbook comprising the electronic logbook data.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The present disclosure presents methods and apparatus for obtaining, presenting, and storing flight data associated with a recent flight or a plurality of flights. In certain embodiments, the recent flight or plurality of flights may be associated with a particular pilot or a group of pilots. Flight data may be presented and analyzed with regard to one individual pilot, or statistics and historical trends may be analyzed with regard to a plurality of pilots.

Certain terminologies are used with regard to the various embodiments of the present disclosure. An electronic logbook is a mechanism for flight data recordkeeping associated with a particular flight, a particular aircraft, and/or a particular pilot. Electronic logbook data may be obtained directly from one or more avionics systems onboard an aircraft. Avionics data may include data generated by one or more avionics systems from which aircraft performance data and/or electronic logbook data may be directly obtained or calculated.

Figure 1:
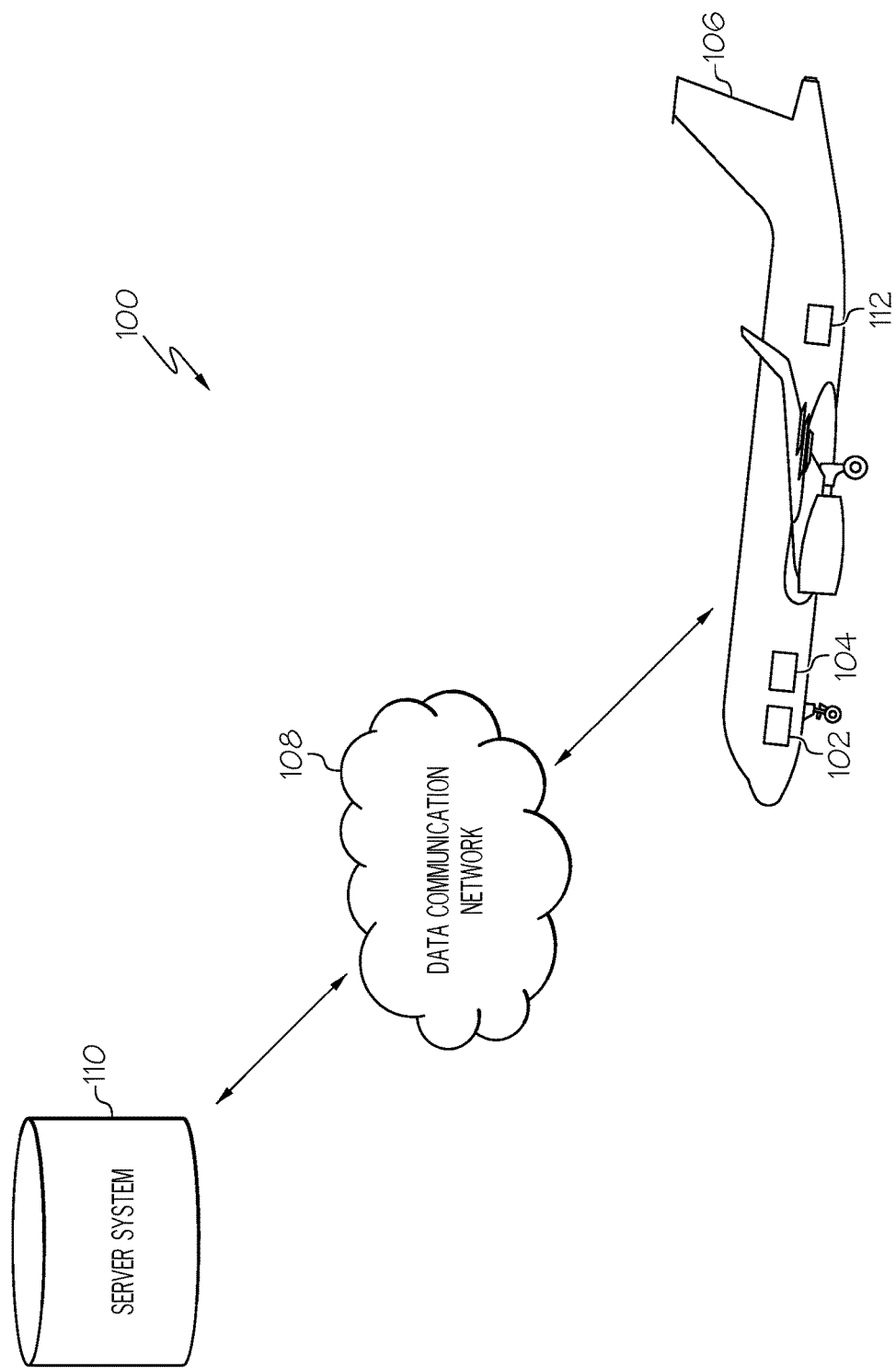
FIG. 1 is a diagram of a system for obtaining flight data, in accordance with the disclosed embodiments.

FIG. 1 is a diagram of a system 100 for obtaining flight data. The system 100 includes an electronic device 102 in communication with the aircraft server 112 onboard an aircraft 106. The electronic device 102 may be implemented using any personal computing device capable of executing software applications, and in particular, Electronic Flight Bag (EFB) software applications. Exemplary embodiments of the electronic device 102 may include, without limitation: a laptop computer, a tablet computer, a smartphone, a smart-watch, a personal digital assistant (PDA), or the like. In the embodiment shown, the electronic device 102 is located onboard the aircraft 106. This is the typical location for the electronic device 102 during flight. However, other embodiments of the system 100 may include one or more electronic devices 102 located onboard the aircraft 106 or external to the aircraft 106. When more than one electronic device 102 is used, a combination of locations onboard the aircraft 106 and external to the aircraft 106 may be used.

The avionics systems 104 may include, without limitation: Air Data Computer (ADC), Flight Guidance Computer (FCM), Flight Management System, (FMS), Navigation Computer, Display Management Unit, etc.

The aircraft server 112 communicates with the avionics systems 104 to obtain flight-specific data, pilot-specific data, and/or aircraft parameter data. The aircraft server 112 handles the processing of data including any performance calculations, graphic generation, and updating of logbooks. Computed and non-computed data is stored on the aircraft server 112 and made available for access by an electronic device 102, which then gets presented as a textual and graphical summary of the flight.

The electronic device 102 and the aircraft server 112 may transmit data to, and receive data from, the server system 110 via a data communication network 108. The data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

The server system 110 may include any number of application servers, and each server may be implemented using any suitable computer. In some embodiments, the server system 110 includes one or more dedicated computers. In some embodiments, the server system 110 includes one or more computers carrying out other functionality in addition to server operations.

The aircraft server 112 communicates with a server system 110 external to the aircraft 106, for the purpose of uploading and storing data obtained from the avionics systems 104. At the server system 110, the flight-specific data, pilot-specific data, and aircraft parameter data may be stored, which may be accessed at a later date or time by an electronic device 102, for purposes of statistical analysis, identifying historical trends, or the like. Additionally, the electronic logbook data may be stored for future use by each applicable pilot, airline, or aviation regulatory authorities.

Figure 2:
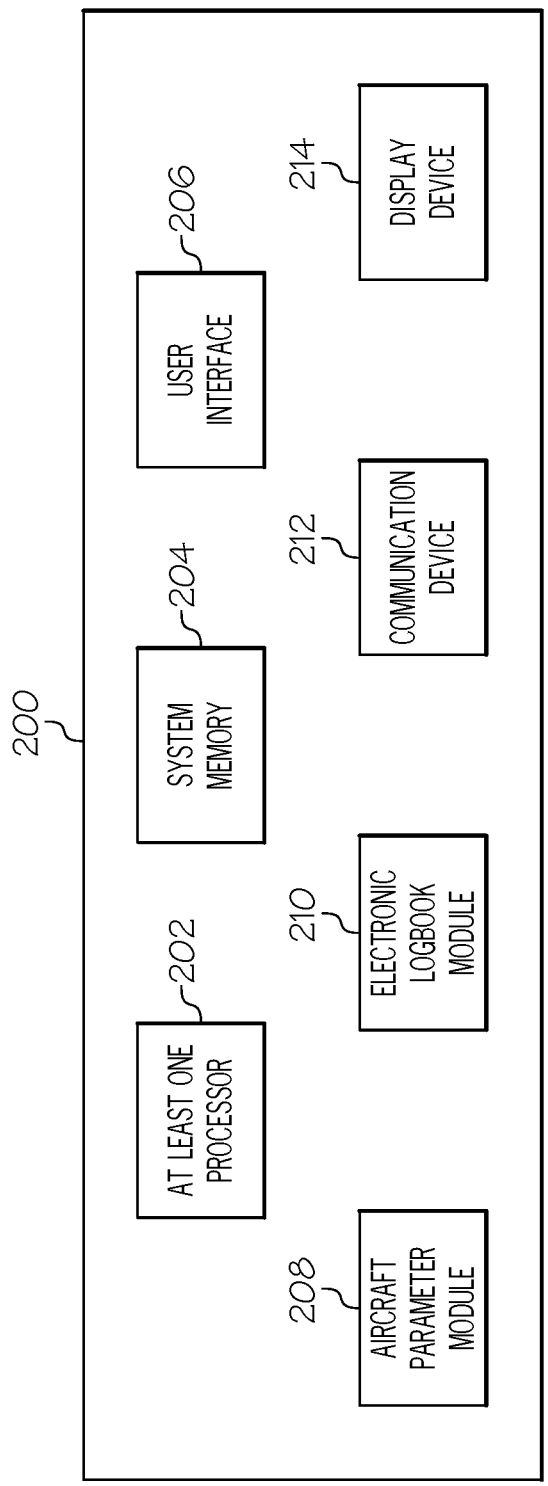
FIG. 2 is a functional block diagram of an electronic device used for obtaining, displaying, and uploading flight data, in accordance with the disclosed embodiments.

FIG. 2 is a functional block diagram of an electronic device 200 used for obtaining, displaying, and uploading flight data. It should be noted that the electronic device 200 can be implemented with the electronic device 102 depicted in FIG. 1. In this regard, the electronic device 200 shows certain elements and components of the electronic device 102 in more detail. The electronic device 200 generally includes, without limitation: at least one processor 202; some form of system memory 204; a user interface 206; an aircraft parameter module 208; an electronic logbook module 210; a communication device 212; and a display device 214. These elements and features of the electronic device 200 may be operatively associated with one another, coupled to one another, or otherwise configured to cooperate with one another as needed to support the desired functionality—in particular, obtaining, displaying, transmitting, and storing flight data, as described herein. For ease of illustration and clarity, the various physical, electrical, and logical couplings and interconnections for these elements and features are not depicted in FIG. 2. Moreover, it should be appreciated that embodiments of the electronic device 200 will include other elements, modules, and features that cooperate to support the desired functionality. For simplicity, FIG. 2 only depicts certain elements that relate to the flight data acquisition and manipulation techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 communicates with system memory 204. The system memory 204 may be used to store aircraft parameter data, electronic logbook data, avionics data, or the like. The system memory 204 may be realized using any number of devices, components, or modules, as appropriate to the embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the at least one processor 202. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the electronic device 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the electronic device 200. For example, the user interface 206 could be manipulated by an operator to make menu selections for purposes of viewing, retrieving, uploading, and storing electronic logbook features and data.

In certain embodiments, the user interface 206 may include or cooperate with various features to allow a user to interact with the electronic device 200 via graphical elements rendered on a display device 214. Accordingly, the user interface 206 may initiate the creation, maintenance, and presentation of a graphical user interface (GUI) and/or other graphical elements. In certain embodiments, the display device 214 implements touch-sensitive technology for purposes of interacting with the GUI. Thus, a user can manipulate the GUI by moving a cursor symbol rendered on the display device 214, or by physically interacting with the display device 214 itself for recognition and interpretation, via the user interface 206.

The aircraft parameter module 208 is configured to capture performance data of the airplane and the pilot. The aircraft parameter module 208 generally obtains, extracts, or otherwise receives this performance data via the communication device 212 from a data communication bus onboard the aircraft (e.g., an Avionics Standard Communication Bus). The aircraft parameter module 208 is also configured to cooperate with the display device 214 to graphically display examples of aircraft and pilot performance data captured from the aircraft avionics as a graphical summary of a flight. This capability allows pilots, operations managers, and others to review detailed summaries of the flight not normally documented in traditional pilot logbooks. The information can be shown for an entire flight or information can be segregated by phase of flight (as defined by the user). Likewise, statistics can be aggregated over time segments defined by the user (days, weeks, months, and years).

Examples of the types of data captured by the aircraft parameter module 208 may include, without limitation: (i) Taxi out: engine start time; gate out time (start of taxi), including difference between scheduled time and actual time; taxi speed; brake usage; taxi efficiency (ratio of time spent not moving with engines running to total taxi time); fuel used; (ii) take off: take off time; difference between scheduled and actual; flight path track down the runway; flight path track during climb out; ground speed/airspeed; weight off wheels (lift off); landing gear position; excessive flight control inputs (pitch, roll, yaw); (iii) departure performance parameters (as measured from weight off wheels to a defined distance from the departure airport): altitude; vertical speed; airspeed; deviation from optimum climb speed; vertical deviation from flight plan; lateral deviation from flight plan; deviation from schedule; departure efficiency including time/fuel used; (iv) cruise (a defined distance from the departure airport to Top of Descent (TOD) point: time in cruise; deviation from schedule; altitude; vertical deviation from flight plan; lateral deviation from flight plan; engine speed; cruise efficiency including time/fuel used; (v) Descent (as measured from TOD—to the Initial Approach Point): altitude; vertical speed; airspeed; engine speed-deviation from idle; vertical deviation from flight plan; lateral deviation from flight plan; deviation from schedule; descent efficiency including time/fuel used; (vi) Approach to land (as measured from Initial Approach Point (IAP) to the runway threshold):; glide slope deviation; altitude; vertical speed; airspeed, engine speed-deviation from idle; vertical deviation from flight plan; lateral deviation from flight plan; excessive pitch, roll, yaw; aircraft configuration, including flap position, speed brake/slat position, landing gear position; autopilot mode; (vii) Landing (as measured from runway threshold to a defined taxi speed (per aircraft)): touch down time, including difference between scheduled and actual; flight path track down the runway; flight path track between threshold and touchdown (WOW); ground speed/airspeed; weight on wheels (touchdown); vertical speed; differential between left and right main landing gear WOW; touchdown distance from runway centerline; touchdown distance from runway threshold; braking performance; and (viii) Taxi in: engine stop time; gate in time (end of taxi), including difference between scheduled and actual; taxi speed; brake usage; taxi efficiency (time spent not moving with engines running); and fuel used.

The electronic logbook module 210 is configured to obtain and record pilot log data and/or flight log data relevant to completing and updating an electronic logbook. An electronic logbook is a mechanism for flight data recordkeeping associated with a particular flight, a particular aircraft, and/or a particular pilot. The electronic logbook module 210 generally obtains, extracts, or otherwise receives this electronic logbook data via the communication device 212 from a data communication bus onboard the aircraft (e.g., an Avionics Standard Communication Bus). The electronic logbook module 210 is generally configured to automatically collect the necessary pilot log data from the Avionics Standard Communication Bus (ASCB) and upload the data wirelessly to a remote server, via the communication device 212. This electronic logbook data, stored at a remote server, is then accessible to the pilots, the operators, or the air carrier operations center via the electronic device 200. Examples of electronic logbook data and electronic logbook calculations that can be derived from data created by the avionics include, but are not limited to: total flight time; total flights; number of landings, detailed information about routes, legs, and landings (e.g., airway route, arrival, approach, departure, airport, runway), total instrument time including types of approaches (e.g., instrument approaches, precision, non-precision, CATI-III approaches); number of landings, type of landings (e.g., day landings, night landings); pilot duty period, daily limits; duty time remaining; Aircraft type (e.g., turbine, rotorcraft, multi-engine land, single-engine land); time in type. Users may also input pilot type (e.g., Captain, First Officer, Pilot in Command, Second in Command); certificates; ratings; endorsement; qualifications, medicals; flight reviews; tail number; routes/legs; and landings.

In practice, the aircraft parameter module 208 and/or the electronic logbook module 210 may be implemented with (or cooperate with) the at least one processor 202 to perform at least some of the functions and operations described in more detail herein. In this regard, the aircraft parameter module 208 and/or the electronic logbook module 210 may be realized as suitably written processing logic, application program code, or the like.

The communication device 212 is suitably configured to (i) obtain avionics system data onboard the aircraft, and (ii) communicate data between the electronic device 200 and one or more remote servers (see, for example, FIG. 1). As described in more detail below, data received by the communication device 212 may include, without limitation, avionics system data and aircraft parameter data. Data provided by the communication device 212 may include electronic logbook data, aircraft parameter data, flight summary data, or the like.

For purposes of accessing avionics system data via the data communication bus onboard the aircraft, the communication device 212 may use any applicable wired or wireless communication link. Generally, the communication device 212 transmits and receives data from one or more remote servers via a wireless communication link. The communication device 212 may transmit and receive communications over a wireless local area network (WLAN), the Internet, a satellite uplink/downlink, a cellular network, a broadband network, a wide area network, or any standard method of aircraft communication. In certain embodiments, the communication device 212 is implemented as an onboard aircraft communication or telematics system. In embodiments wherein the communication device 212 is a telematics module, an internal transceiver may be capable of providing bi-directional mobile phone voice and data communication, implemented as Code Division Multiple Access (CDMA), Universal Mobile Telecommunications System (UMTS) wideband CDMA (W-CDMA), Enhanced Data Rates for GSM Evolution (EDGE), Evolved EDGE, High Speed Packet Access (HSPA), CDMA2000, Evolved High Speed Packet Access (HSPA+), Long Term Evolution (LTE) and/or Long Term Evolution-Advanced (LTE-A).

The display device 214 is configured to display various icons, text, and/or graphical elements associated with electronic logbook data, aircraft parameter data, and/or other statistical data or historical trend data associated with aircraft or pilot performance onboard an aircraft. In an exemplary embodiment, the display device 214 is communicatively coupled to the user interface 206. The user interface 206 is communicatively coupled to the at least one processor 202, and the at least one processor 202 and the user interface 206 are cooperatively configured to display, render, or otherwise convey one or more graphical representations or images associated with electronic logbook and/or summary data for one or more particular flights on the display device 214, as described in greater detail below. In an exemplary embodiment, the display device 214 is realized as an electronic display configured to graphically display electronic logbook data and flight summary data. In some embodiments, the display device 214 is located within a cockpit of the aircraft. It will be appreciated that although the display device 214 may be implemented using a single aircraft display device, certain embodiments may use additional display devices to accomplish the functionality of the display device 214 described herein.

Figure 3:
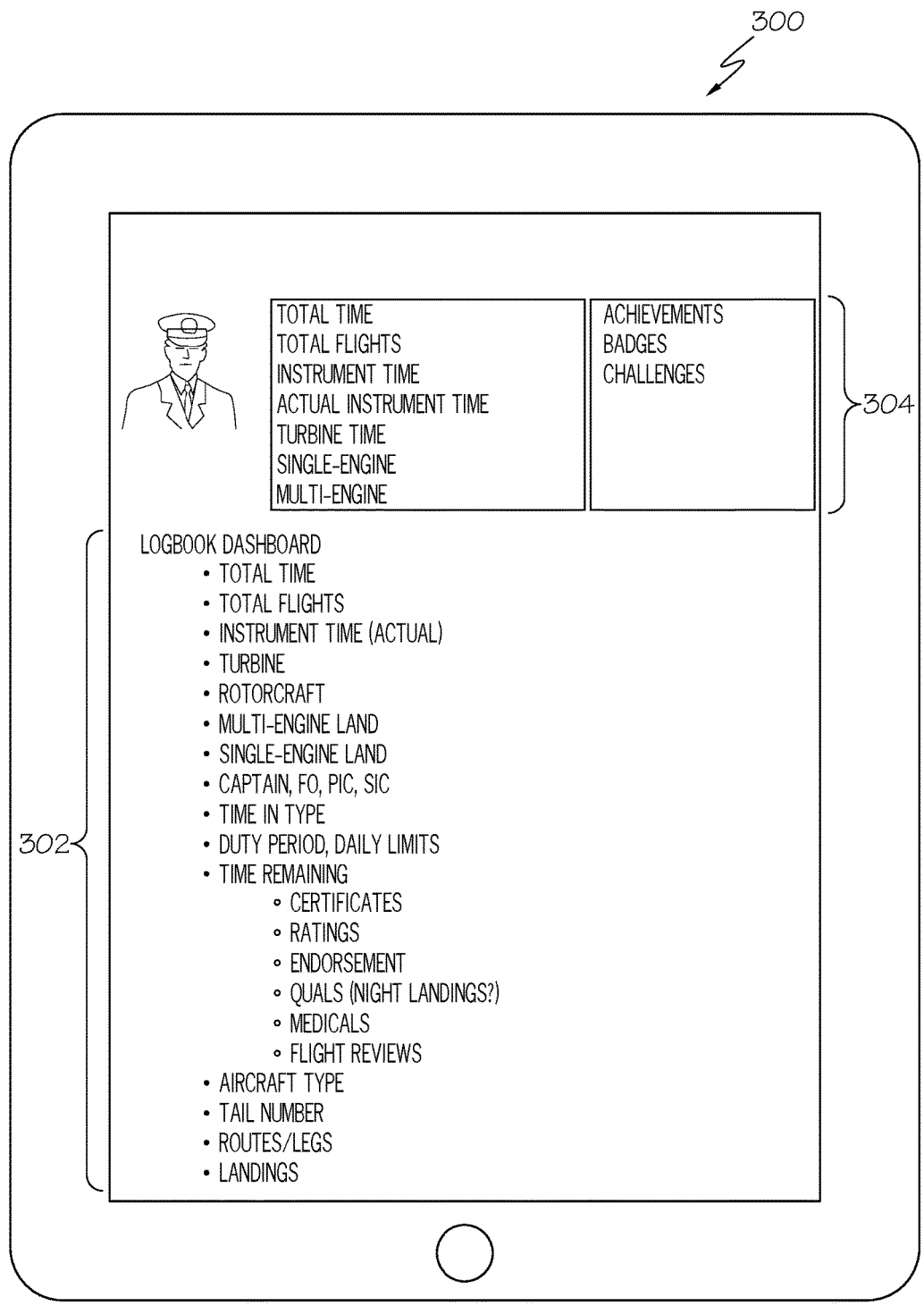
FIG. 3 is a diagram of an electronic flight bag or personal computing device application for flight data, in accordance with the disclosed embodiments.

FIG. 3 is a diagram of one exemplary embodiment of an electronic device 300 capable of executing an electronic flight bag (EFB) application for flight data. It should be noted that the electronic device 300 can be implemented with the electronic device 102 depicted in FIG. 1 and/or the electronic device 200 depicted in FIG. 2. In this regard, the electronic device 300 shows certain elements and components of the electronic device 102 and/or the electronic device 200 in more detail. In practice, an embodiment of the electronic device 300 may include additional or alternative elements and components, as desired for the particular application. For example, additional components such as displays and user input components may be employed without departing from the scope of the present disclosure. In the exemplary embodiment shown, the electronic device 300 may be implemented as a tablet computer capable of executing an EFB application for an electronic logbook. Each electronic device 300 is generally owned and/or operated by one particular pilot, and provides EFB information to that pilot that is relevant to an aircraft that the particular pilot is operating currently, that the pilot was operating for a past flight, or that the pilot will be operating for an applicable future flight.

The electronic logbook includes pilot-specific data 304, which includes total time, total flights, instrument time, actual instrument time, turbine time, single-engine, multi-engine, achievements, badges, and challenges for a particular pilot. The electronic logbook further includes a "LogBook Dashboard" 302, which displays information that includes total time; total flights; instrument time (actual); turbine; rotorcraft; multi-engine land; single-engine land; captain, FO, PIC, SIC; time in type; duty period, daily limits; time remaining (certificates, ratings, endorsement, qualifications (night landings), medicals, flight reviews); aircraft type; tail number; routes/legs; and landings. As shown, the data presented via the pilot-specific data 304 and via the LogBook Dashboard 302 are geared toward a particular pilot, and the EFB application presents data and statistics for that particular pilot.

The aircraft server 112 is configured to establish a wired or wireless communication link with an Avionics Standard Communication Bus (ASCB) and to obtain flight data generated by the avionics onboard the aircraft. The avionics data obtained is used to directly or indirectly (through calculations) identify the parameters presented by the electronic device 300, including the pilot-specific data 304 parameters and the LogBook Dashboard 302 data parameters. Once identified, the parameters are presented by the electronic device 300 via the EFP application, as shown. Additionally, the aircraft server 112 uploads the avionics data and/or the electronic logbook data, via wireless communication to a remote server, for storage and future accessibility.

Figure 4:
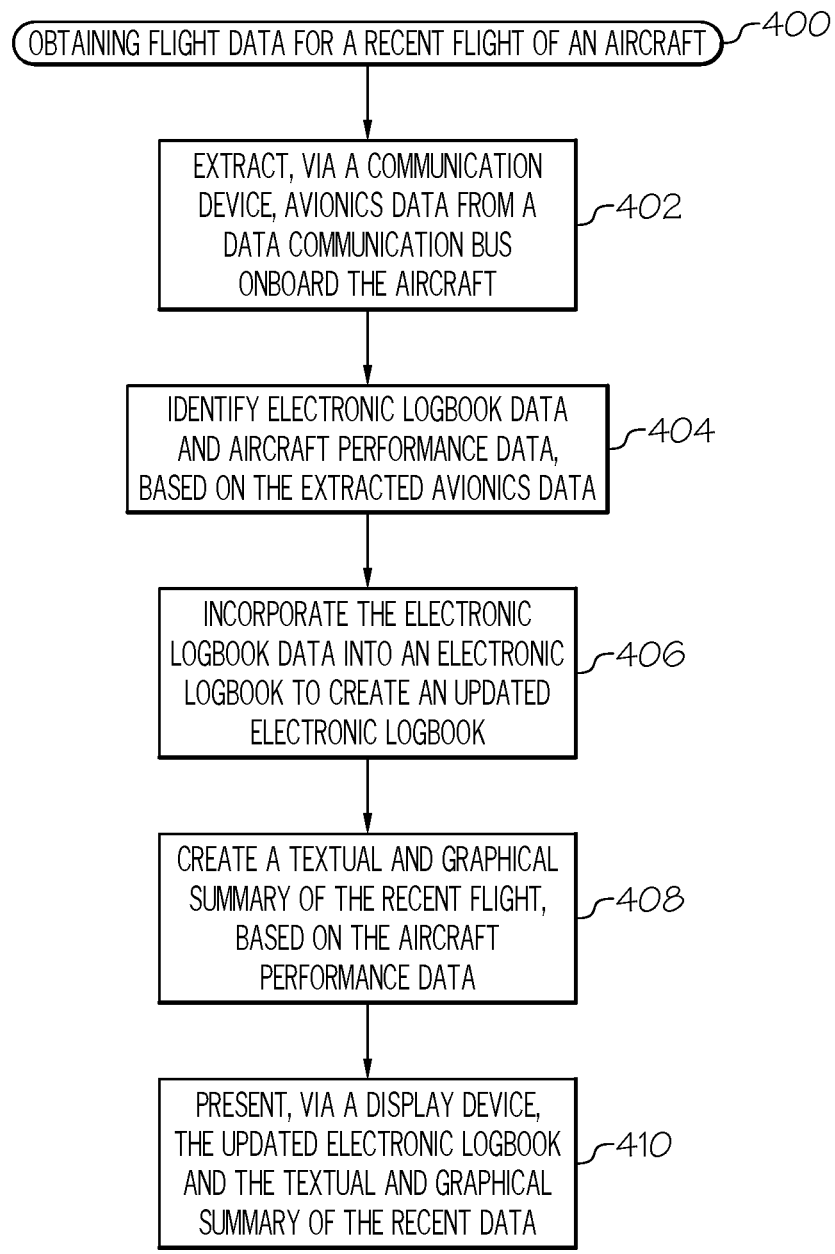
FIG. 4 is a flow chart that illustrates an embodiment of a process for obtaining flight data for a recent flight of an aircraft.

FIG. 4 is a flow chart that illustrates an embodiment of a process 400 for obtaining flight data for a recent flight of an aircraft. First, the process 400 extracts, via a communication device, avionics data from a data communication bus onboard the aircraft (step 402). Avionics data may include data generated by one or more avionics systems from which aircraft performance data and/or electronic logbook data may be directly obtained or calculated.

Next, the process 400 identifies electronic logbook data and aircraft performance data based on the extracted avionics data (step 404). Here, the process 400 identifies a set of avionics data which may be extracted and used directly, without change, in the electronic logbook and/or a flight summary (described below). The process 400 also identifies a second set of data which may be extracted and used to calculate particular values for the electronic logbook or the flight summary. For example, variables such as data and time can be collected from the flight computer, the departure, route, and arrival locations can be retrieved from the navigation system. The duration of an individual flight time would calculated by subtracting the time of landing (when Weight on Wheels (WOW) sensors=1) from the time of takeoff (WOW) sensors=0. This individual flight time data can be aggregated by the logbook application to calculate total flight time of the individual pilot and aircraft.

The process 400 then incorporates the avionics data into an electronic logbook to create an updated electronic logbook (step 406). The electronic logbook may be a flight logbook or a pilot logbook. In embodiments where the electronic logbook is a flight logbook, the process 400 incorporates avionics data applicable to a particular flight. In embodiments where the electronic logbook is a pilot logbook, the process 400 incorporates avionics data for one or more flights applicable to a particular pilot. Next, the process 400 creates a graphical summary of the recent flight, based on the aircraft performance data (step 408). The graphical summary may be used to present data described previously, with regard to the aircraft parameter module of FIG. 2. Creating and storing the graphical summary of the recent flight allows pilots, operations managers, and others to review detailed summaries of the flight not normally documented in traditional pilot logbooks.

The process 400 then presents, via a display device, the updated electronic logbook and the textual and graphical summary of the recent flight (step 410). In certain embodiments, the process 400 generates a graphical user interface (GUI) and/or other graphical elements via a display device, wherein the GUI is used for presentation of the electronic logbook. The process 400 may present the electronic logbook and the textual and graphical summary using the same display device, or using separate and distinct display devices. In some embodiments, the process 400 presents the electronic logbook data and the graphical summary data for the entirety of the recent flight. In other embodiments, the process 400 filters the extracted avionics data to identify data for a particular phase of flight and then presents the electronic logbook data and the graphical summary data for the particular phase of flight. In some embodiments, the process 400 also transmits or uploads the updated electronic logbook and the graphical summary data to a server or other data storage location.

Figure 5:
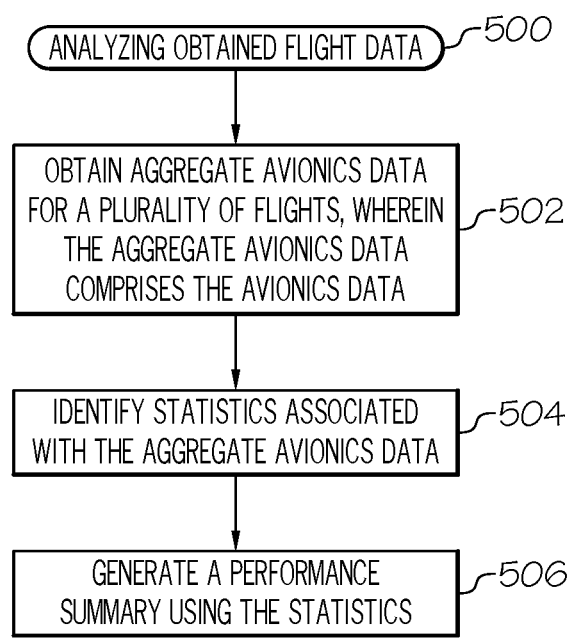
FIG. 5 is a flow chart that illustrates an embodiment of a process for analyzing obtained flight data.

FIG. 5 is a flow chart that illustrates an embodiment of a process for analyzing obtained flight data. First, the process 500 obtains aggregate avionics data for a plurality of flights, wherein the aggregate avionics data comprises the avionics data (step 502). Here, the process 500 obtains a first set of avionics data for the current flight from the data communication bus onboard the aircraft, and obtains a second set of additional avionics data that is associated with other flights from a data storage location (e.g., a remote server accessible from the aircraft and/or a system memory element onboard the aircraft). The aggregate avionics data includes the first set of avionics data and the second set of avionics data, which includes aircraft performance parameters and pilot-specific, electronic logbook data.

Figure 6:
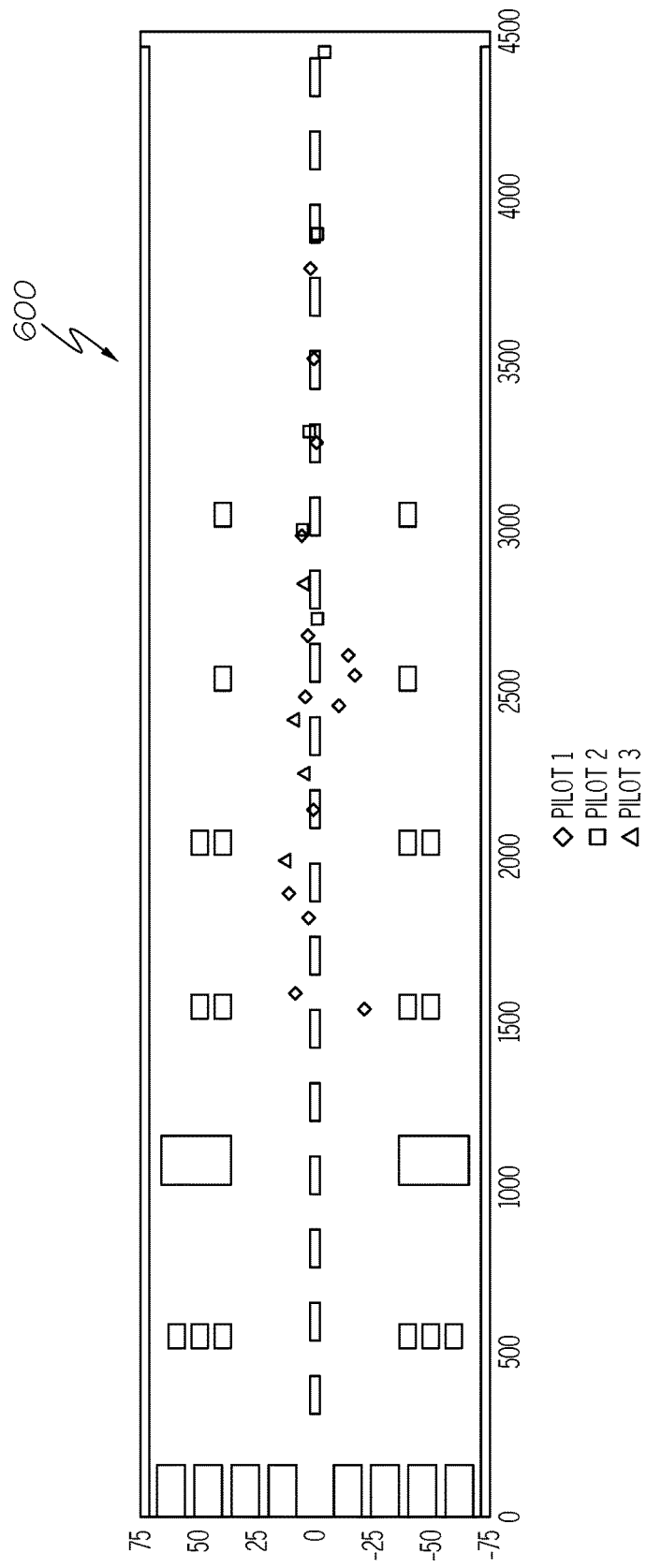
FIG. 6 is a graphical representation of a performance summary generated using aggregate avionics data, in accordance with the disclosed embodiments.

Next, the process 500 identifies statistics associated with the aggregate avionics data (step 504), and then generates a performance summary, using the statistics (step 506). In some embodiments, the process 500 obtains aggregate avionics data for a specific period of time (step 502), and then identifies statistics associated with the aggregate avionics data that are applicable to the particular period of time. Here, the process 500 analyzes the aggregate avionics data to identify any patterns or trends in the historical data, or to make comparisons and perform analysis based on those comparisons. As one example, the process 500 may identify landing precision statistics for a plurality of pilots, as depicted in FIG. 6, and present a graphical representation 600 of the landing precision statistics such that the performance of each pilot, with regard to landing precision, may be viewed and compared. The performance summary presented in FIG. 6 may be generated onboard an aircraft during flight or during pre-flight or post-flight analysis procedures. Returning to FIG. 5, other embodiments of the process 500 may generate and present a performance summary related to other avionics data parameters.

The various tasks performed in connection with processes 400-500 may be performed by software, hardware, firmware, or any combination thereof. For illustrative purposes, the following description of processes 400-500 may refer to elements mentioned above in connection with FIGS. 1-3. In practice, portions of processes 400-500 may be performed by different elements of the described system. It should be appreciated that processes 400-500 may include any number of additional or alternative tasks, the tasks shown in FIGS. 4-5 need not be performed in the illustrated order, and processes 400-500 may be incorporated into a more comprehensive procedure or process having additional functionality not described in detail herein. Moreover, one or more of the tasks shown in FIGS. 4-5 could be omitted from an embodiment of either of the processes 400-500, as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for obtaining flight data, by an electronic device, for one or more recent flights of an aircraft, the method comprising:

extracting avionics data from a data communication bus onboard the aircraft, via a communication device communicatively coupled to at least one processor and a system memory element, wherein the electronic device comprises at least the communication device, the at least one processor, and the system memory element;

identifying electronic logbook data and aircraft performance data, by the at least one processor, based on the extracted avionics data;

incorporating the electronic logbook data into an electronic logbook stored in the system memory element to create an updated electronic logbook, by the at least one processor, wherein the electronic logbook comprises a mechanism for flight data recordkeeping associated with at least one of a particular flight, the aircraft, and a particular pilot;

creating a summary of the one or more recent flights, by the at least one processor, based on the aircraft performance data; and presenting, via a display device communicatively coupled to the at least one processor, the updated electronic logbook and the summary of the one or more recent flights, wherein the electronic device further comprises the display device;

obtaining aggregate avionics data for a plurality of flights, wherein the aggregate data comprises the avionics data; and identifying statistics associated with the aggregate avionics data;

wherein the one or more recent flights comprises the plurality of flights.

2. The method of claim 1, further comprising:
generating a graphical user interface (GUI) associated with the updated electronic logbook; and
creating a graphical summary of the one or more recent flights, wherein the summary comprises the graphical summary;
wherein presenting the updated electronic logbook and the summary further comprises presenting the GUI and the graphical summary.

3. The method of claim 1, further comprising:
uploading, via the communication device, the updated electronic logbook and the aircraft performance data to a remote server.

4. The method of claim 1, wherein the avionics data includes data for an entirety of a flight of the one or more recent flights; and
wherein presenting the updated electronic logbook further comprises presenting the data for the entirety of the flight.

5. The method of claim 1, further comprising:
filtering the extracted avionics data to identify a set of data for a particular phase of flight;
wherein presenting the updated electronic logbook further comprises presenting the set of data for the particular phase of flight.

6. The method of claim 1, wherein the aggregate avionics data is obtained for a particular period of time; and
wherein the statistics are applicable to the particular period of time.

7. The method of claim 1, wherein the aggregate avionics data for the plurality of flights is applicable to a plurality of pilots; and
wherein the method further comprises:
generating a performance summary for the plurality of pilots, based on the aggregate avionics data; and presenting the performance summary of the aggregate avionics data, via the display device.

8. An electronic device for obtaining flight data onboard an aircraft, the electronic device comprising:
a memory element, configured to store an electronic logbook;
a communication device, configured to establish a first communication link with a data communication bus onboard the aircraft;
a display device, configured to present graphical elements associated with the electronic logbook; and
at least one processor, communicatively coupled to the memory element, the communication device, and the display device, the at least one processor configured to:
extract, via the communication device, avionics data from the data communication bus;
identify electronic logbook data and aircraft performance data, based on the extracted avionics data;
incorporate the avionics data into the electronic logbook to create an updated electronic logbook;
create a graphical summary of a recent flight, based on the aircraft performance data; and
present, via the display device, the updated electronic logbook and the graphical summary of the recent flight;
wherein the electronic logbook comprises a flight logbook configured to aggregate data associated with a plurality of flights, or a pilot logbook configured to aggregate data associated with a particular pilot.

9. The electronic device of claim 8, wherein the communication device is further configured to establish a second communication link with a remote server; and
wherein the at least one processor is further configured to upload, via the communication device, the updated electronic logbook to the remote server over the second communication link.

10. The electronic device of claim 8, wherein the avionics data includes data for an entirety of the recent flight; and
wherein the updated electronic flight logbook comprises presenting the data for the entirety of the recent flight.

11. The electronic device of claim 8, wherein the at least one processor is further configured to:
filter the extracted avionics data to identify a set of data associated with a particular phase of flight;
wherein the updated electronic logbook comprises presenting the set of data for the particular phase of flight.

12. A non-transitory, computer-readable medium of an electronic device, containing instructions thereon, which, when executed by a processor, perform a method comprising:
obtaining electronic logbook data and aircraft performance data transmitted over a data communication bus onboard an aircraft, via a communication device communicatively coupled to the processor, wherein the electronic device comprises at least the communication device, the processor, and the non-transitory, computer-readable medium, and wherein the electronic logbook data and aircraft performance data are derived from avionics data originating from avionics systems onboard the aircraft; and
presenting an updated electronic logbook comprising the electronic logbook data, via a display communicatively coupled to the processor, wherein the electronic device further comprises the display;
obtaining aggregate avionics data for a plurality of flights, wherein the aggregate data comprises the avionics data; and
identifying statistics associated with the aggregate avionics data.

13. The non-transitory, computer-readable medium of claim 12, wherein presenting the updated electronic logbook further comprises:
generating a graphical user interface (GUI) associated with the updated electronic logbook; and
presenting the updated electronic logbook via the GUI.

14. The non-transitory, computer-readable medium of claim 12, wherein the method further comprises:
uploading, via the communication device, the updated electronic logbook and the aircraft performance data to a remote server.

15. The non-transitory, computer-readable medium of claim 12, wherein obtaining the aggregate avionics data occurs over a particular period of time; and
wherein the statistics are applicable to the particular period of time.

16. The non-transitory, computer-readable medium of claim 12, wherein the aggregate avionics data for the plurality of flights is applicable to a plurality of pilots; and
wherein the method further comprises:
generating a performance summary for the plurality of pilots, based on the aggregate avionics data;
presenting the performance summary of the aggregate avionics data, via the display; and
uploading the performance summary, via the communication device, to the remote server.

* * * * *